United States Patent
Coowar et al.

(10) Patent No.: US 10,403,937 B2
(45) Date of Patent: Sep. 3, 2019

(54) METHOD OF MANUFACTURING AN ELECTROCHEMICAL CELL

(71) Applicant: Dyson Technology Limited, Wiltshire (GB)

(72) Inventors: Fazlil Ahmode Coowar, Swindon (GB); Emmanuel Imasuen Eweka, Southampton (GB); Mamdouh Elsayed Abdelsalam, Bristol (GB); Alex Madsen, Swindon (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 144 days.

(21) Appl. No.: 15/312,579

(22) PCT Filed: May 11, 2015

(86) PCT No.: PCT/GB2015/051372
§ 371 (c)(1),
(2) Date: Nov. 18, 2016

(87) PCT Pub. No.: WO2015/177509
PCT Pub. Date: Nov. 26, 2015

(65) Prior Publication Data
US 2017/0092995 A1    Mar. 30, 2017

(30) Foreign Application Priority Data
May 20, 2014    (GB) .................... 1408952.8

(51) Int. Cl.
*H01M 10/44* (2006.01)
*H01M 10/0525* (2010.01)
(Continued)

(52) U.S. Cl.
CPC ..... *H01M 10/446* (2013.01); *H01M 10/0525* (2013.01); *H01M 10/0565* (2013.01);
(Continued)

(58) Field of Classification Search
CPC .......... H01M 10/446; H01M 10/0587; H01M 10/0525; H01M 10/0565; H01M 2300/0085
(Continued)

(56) References Cited

U.S. PATENT DOCUMENTS 4,687,718 A    8/1987    Chreitzberg et al.
5,272,240 A *  12/1993   Haruvy .................. C03C 1/008
                                                     528/10
(Continued)

FOREIGN PATENT DOCUMENTS

CN    1838470       9/2006
DE    101 22 811    11/2002
(Continued)

OTHER PUBLICATIONS

Search Report dated Jan. 6, 2015, directed to GB Application No. 1408952.8; 1 page.
(Continued)

*Primary Examiner* — Gary D Harris
(74) *Attorney, Agent, or Firm* — Morrison & Foerster LLP

(57) ABSTRACT

A method of manufacturing an electrochemical cell having a gel electrolyte. An electrochemical cell is provided having a cell casing, and a first electrode, a second electrode, an electrolyte solution and a temperature activated gelling agent disposed within the cell casing. A gel electrolyte comprising the electrolyte solution and the gelling agent is formed by passing a current through the electrochemical cell such that the temperature of the gelling agent exceeds the activation temperature of the gelling agent.

24 Claims, 2 Drawing Sheets

(51) Int. Cl.
  *H01M 10/0565* (2010.01)
  *H01M 10/0587* (2010.01)
  *H01M 10/10* (2006.01)
(52) U.S. Cl.
  CPC ........ *H01M 10/0587* (2013.01); *H01M 10/10* (2013.01); *H01M 2300/0085* (2013.01)
(58) Field of Classification Search
  USPC .......................................................... 429/303
  See application file for complete search history.

(56) References Cited

U.S. PATENT DOCUMENTS

| | | | |
|---|---|---|---|
| 6,071,648 | A | 6/2000 | Watanabe et al. |
| 6,180,282 | B1 | 1/2001 | Nishida et al. |
| 6,287,719 | B1 | 9/2001 | Bailey |
| 6,395,423 | B1 | 5/2002 | Kawakami et al. |
| 6,420,065 | B1 | 7/2002 | Yde-Andersen et al. |
| 6,534,218 | B1 | 3/2003 | Okada et al. |
| 6,566,013 | B2 | 5/2003 | Nakamizo et al. |
| 6,627,344 | B2 | 9/2003 | Kang et al. |
| 6,680,147 | B2 | 1/2004 | Lee |
| 6,780,544 | B2 | 8/2004 | Noh |
| 6,835,214 | B2 | 12/2004 | Kitano et al. |
| 6,841,303 | B2 | 1/2005 | Park et al. |
| 6,913,856 | B2 | 7/2005 | Nirasawa et al. |
| 7,008,722 | B2 | 3/2006 | Huang |
| 7,033,405 | B2 | 4/2006 | Bun et al. |
| 7,125,630 | B2 | 10/2006 | Tanizaki et al. |
| 7,279,251 | B1 | 10/2007 | Yun et al. |
| 7,381,500 | B2 | 6/2008 | Oh et al. |
| 7,524,393 | B2 | 4/2009 | Mizutani et al. |
| 7,718,322 | B2 | 5/2010 | Lee et al. |
| 8,481,205 | B2 | 7/2013 | Yamada et al. |
| 2002/0034691 | A1 | 3/2002 | Segawa |
| 2003/0192170 | A1 | 10/2003 | Jan et al. |
| 2003/0194607 | A1 | 10/2003 | Huang |
| 2004/0259000 | A1 | 12/2004 | Adachi et al. |
| 2005/0084762 | A1* | 4/2005 | Vaccaro .............. H01M 2/1613 429/302 |
| 2008/0134492 | A1 | 6/2008 | Amine et al. |
| 2008/0152998 | A1 | 6/2008 | Murakami et al. |
| 2009/0311608 | A1 | 12/2009 | Hirose et al. |
| 2010/0330433 | A1* | 12/2010 | Amine .................. H01M 6/181 429/302 |
| 2011/0177369 | A1 | 7/2011 | Endo et al. |
| 2012/0141849 | A1 | 6/2012 | Lin |
| 2013/0052535 | A1 | 2/2013 | Yanagihara et al. |
| 2014/0059844 | A1 | 3/2014 | Tsai et al. |

FOREIGN PATENT DOCUMENTS

| | | |
|---|---|---|
| DE | 10 2008 041 319 | 2/2010 |
| JP | 2-162651 | 6/1990 |
| JP | 2-260367 | 10/1990 |
| JP | 9-35749 | 2/1997 |
| JP | 10-92470 | 4/1998 |
| JP | 11-26025 | 1/1999 |
| JP | 11-121035 | 4/1999 |
| JP | 11-176420 | 7/1999 |
| JP | 11-260410 | 9/1999 |
| JP | 2001-243986 | 9/2001 |
| JP | 2005-197144 | 7/2005 |
| JP | 2006-196235 | 7/2006 |
| JP | 2008-146921 | 6/2008 |
| JP | 2012-169071 | 9/2012 |
| KR | 2002-0008582 | 3/2002 |
| KR | 2002-0019214 | 3/2002 |
| WO | WO-2013/046555 | 4/2013 |

OTHER PUBLICATIONS

International Search Report and Written Opinion dated Jun. 26, 2015, directed to International Application No. PCT/GB2015/051372; 8 pages.

* cited by examiner

METHOD OF MANUFACTURING AN ELECTROCHEMICAL CELL

REFERENCE TO RELATED APPLICATIONS

This application is a national stage application under 35 USC 371 of International Application No. PCT/GB2015/051372, filed May 11, 2015, which claims the priority of United Kingdom Application No. 1408952.8, filed May 20, 2014, the entire contents of which are incorporated herein by reference.

FIELD OF THE INVENTION

This invention relates to a method of manufacturing an electrochemical cell and particularly, although not exclusively, relates to a method of manufacturing a lithium-ion cell such as a high-power lithium-ion cell.

BACKGROUND OF THE INVENTION

Typically, lithium-ion cells contain a liquid electrolyte comprising flammable organic solvents. If the cell is exposed to physical or electrical abuse, such as shorting, external heating, overcharge or overdischarge the cell can enter thermal runaway conditions, whereby the flammable liquid electrolyte is vaporised and, in extreme circumstances, ejected from the cell. The release of flammable materials, combined with an elevated cell temperature presents an inherent fire hazard. In order to mitigate the risk associated with liquid electrolytes, it is known to use gel electrolytes.

US2003/0194607A describes a method of making a lithium-ion cell having a gel electrolyte by assembling the components of the cell and then subjecting the assembled cell to a polymer gel formation process by heating in order to form a polymer-gel electrolyte.

The process of forming the polymer-gel electrolyte using this method is both time consuming and costly.

SUMMARY OF THE INVENTION

According to the present invention there is provided a method of manufacturing an electrochemical cell having a gel electrolyte comprising the steps: providing an electrochemical cell comprising a cell casing, and a first electrode, a second electrode, an electrolyte solution and a temperature activated gelling agent disposed within the cell casing; forming a gel electrolyte comprising the electrolyte solution and the gelling agent by passing a current through the electrochemical cell such that the temperature of the gelling agent exceeds the activation temperature of the gelling agent.

The gelling agent may have an activation temperature which is not less than 40° C. For example, the activation temperature may be not less than 60° C.

The gelling agent may comprise a polymer. The polymer may comprise polyvinylidene fluoride-hexafluoropropylene (PVDF:HFP) or polyethylene oxide (PEO).

The first electrode, second electrode, electrolyte solution and gelling agent may be hermetically sealed within the casing prior to forming the gel electrolyte.

The applied current may be sufficient to vaporise at least some of the electrolyte solution thereby generating an increase in pressure within the cell. The cell casing may be configured to resist the pressure generated within the cell casing. The cell casing may be rigid. The pressure generated may be greater than atmospheric (ambient) pressure. For example, the pressure may be at least 0.1 MPa above ambient pressure, for example at least 0.2 MPa above ambient pressure, such as at least 0.5 MPa above ambient pressure. The current may be at least 10 A, for example at least 15 A. The internal resistivity of the cell may be at least 15 mΩ, for example, at least 30 mΩ.

The current may be passed through the cell by discharging the cell. The cell may be discharged at a rate of not less than 1C. Alternatively, the current may be passed through the cell by charging the cell.

The cell casing may be cylindrical and the first electrode and the second electrode may be wound about the longitudinal axis of the casing. The electrochemical cell may be a high-power lithium-ion cell.

A separator may be disposed between the first electrode and the second electrode. The separator may be porous. The separator may be imbued with the gelling agent prior to formation of the gel electrolyte. The gelling agent may have an activation temperature that does not exceed the melting temperature of the separator. The gelling agent may be deposited on at least one of the first electrode, the second electrode and the separator prior to forming of the gel electrolyte.

The method may comprise the step of depositing the gelling agent on the at least one of the first electrode, the second electrode and the separator by dissolving the gelling agent in a solvent, immersing the at least one of the first electrode, second electrode and separator in the solvent and then removing the solvent.

The gelling agent may be mixed with the electrolyte solution prior to forming the gel electrolyte. The electrolyte solution may comprise a non-aqueous solvent. The cell may be insulated during formation of the gel.

BRIEF DESCRIPTION OF THE DRAWINGS

In order to better understand the present invention, and to show more clearly how the invention may be put into effect, the invention will now be described, by way of example, with reference to the following drawings.

DETAILED DESCRIPTION OF THE INVENTION

Figure 1:
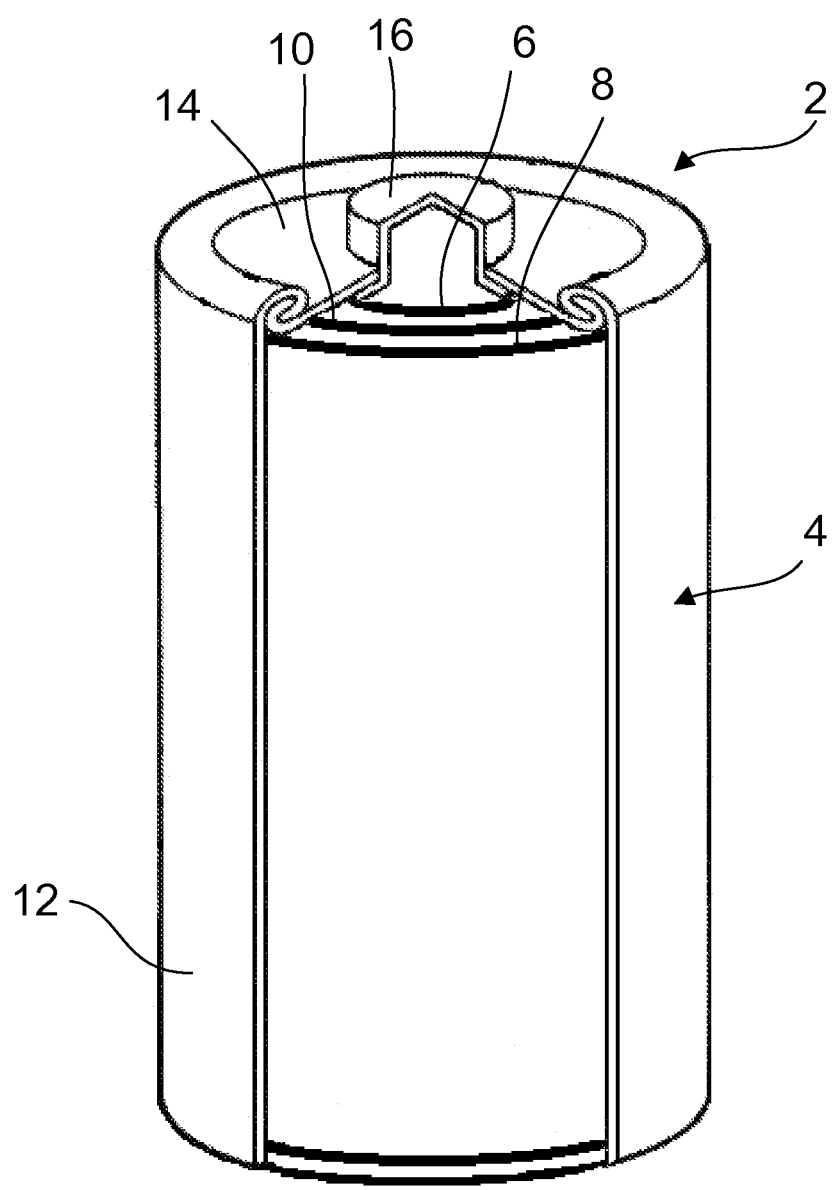
FIG. 1 is a schematic representation of a first embodiment of an electrochemical cell.

FIG. 1 shows a secondary (i.e. rechargeable) electrochemical cell 2 comprising a cell casing 4, a first electrode 6, a second electrode 8 and a separator 10. In the present embodiment, the cell 2 is a high-power cell, in the form of a lithium-ion cell, which can be discharged at a relatively high C-rate.

The C-rate of a cell is defined as the rate at which a cell is charged/discharged relative to the maximum capacity of the cell. Conventionally, a rate of 1C is equivalent to the applied current necessary to fully charge/discharge the battery in 1 hour. It therefore takes an hour to fully charge or discharge a battery at a rate of 1C. A rate of 0.1C is equivalent to the rate at which a battery is discharged in order to fully discharge the battery in 10 hours. High-power cells can be distinguished from high-energy cells which typically cannot be discharged at a C-rate of greater than 1C.

The casing 4 comprises a cylindrical main body 12 which is closed at one end, and a cap 14 which closes the other end of the cylindrical main body 12. The casing 4 is rigid and may be made from metal or other suitable material.

The separator 10 is interposed between the first electrode 6 and the second electrode 8 so as to electrically isolate the first electrode 6 from the second electrode 8. The first electrode 6, the second electrode 8 and the separator 10 are spirally wound about the longitudinal axis of the casing 4 so that they form a roll within the casing 4. The wound arrangement is often referred to as a "jelly roll" in the art of electrochemical cells.

The cell casing 4 contains a gel electrolyte comprising an electrolyte solution and a gelling agent in the form of a polymer.

A central portion of the cap 14 forms a first terminal 16 which is electrically connected to the first electrode 6, and at least part of the base (not visible) of the cylindrical main body 12 forms a second terminal which is electrically connected to the second electrode 8.

A method of manufacturing the electrochemical cell 2 will now be described.

The first electrode 6, second electrode 8 and the separator 10 are formed in elongate strips which are then laid on top of each other. The separator 10 is interposed between the first and second electrodes 6, 8 so that it forms the middle layer. The separator 10 prevents the first electrode 6 and the second electrode 8 from contacting each other.

The first and second electrodes 6, 8 may be formed of any suitable material. For example, the first electrode 6, which in the embodiment shown forms a cathode during discharge of the cell 2, may comprise $LiCoO_2$, $LiNi_xMn_{(2-x)}O_2$, $LiNi_xCo_yAl_{(1-x-y)}O_2$, lithium ion phosphate, intergrowth materials such as $Li_2MnO_3$-$LiMnO_2$, two-dimensional and three-dimensional layered, olivine, spinel type metal oxide intercalation and insertion materials, polyanionic materials and conversion type materials. The second electrode 8, which in the embodiment shown forms an anode during discharge of the cell 2, may comprise graphite, hard carbon, suitable alloy materials such as Si, Sn, Al, Bi, spinel type materials or suitable conversion materials such as CoO, $Li_4Ti_5O_{12}$.

The separator 10, may comprise a polyolefin, a ceramic and/or other suitable material. For example, the separator 10 may be mono layer comprising a layer of polypropylene (PP) or polyethylene (PE), bilayer comprising a layer of PP and a layer of PE or trilayer comprising two layers of PP interposed by a layer of PE. The separator 10 may comprise three-dimensionally ordered, non woven separator materials such as polyimides. The separator 10 may be coated with a ceramic material. The separator 10 is porous so as to allow ions to flow from one of the electrodes 6, 8 to the other 6, 8. It will be appreciated that means other than use of a porous separator 10 may be used to maintain separation of the electrodes 6, 8.

The first electrode 6, second electrode 8 and the separator 10 are wound into a jelly roll and inserted into the cylindrical main body 12 of the casing 4.

The cylindrical main body 12 is filled with a mixture of the electrolyte solution and the gelling agent by vacuum filling. It will be appreciated that the electrolyte solution and the gelling agent may be supplied as a premix or added separately to create the mixture within the cylindrical main body 12.

The electrolyte solution is a non-aqueous solvent containing salts. The electrolyte solution may comprise non-aqueous solvents such as carbonate solvents including propylene carbonate (PC), ethylene carbonate (EC), dimethyl carbonate (DMC), ethyl-methyl carbonate (EMC), vinylene carbonate (VC), diethyl carbonate (DEC) or flourethylene carbonate (FEC), for example. The salts may comprise $LiPF_6$, $LiCF_3SO_3$, $LiCLO_4$, LiBOB, LiTFSi, LiFSi or $LiASF_6$, for example.

The gelling agent is a polymer (i.e. a precursor polymer) which acts as a gelling agent when heated. For example the polymer may comprise polyvinylidene fluoride-hexafluoropropylene (PVDF:HFP) or polyethylene oxide (PEO) or poly(methyl methacrylate) (PMMA), polyacrylonitrile (PAN), or terpolymers of vinylidene fluoride-hexafluoropropylene-chlorotrifluoroethylene (VDF:HFP:CTFE) for example. The polymer has an activation temperature at which the polymer will begin to soften or melt such that subsequent cooling of the mixture of the electrolyte solution and the polymer forms a gel. The activation temperature should be not less than 40° C., but may be not less than 50° C., 60° C., 70° C. or 80° C. Where a separator 10 is provided, the activation temperature should not exceed the melting temperature of the separator 10.

The cap 14 is then secured to the end of the cylindrical main body 12. The cap 14 forms an air-tight fit with the cylindrical main body 12 so that the electrodes 6, 8, separator 10 and the mixture of the electrolyte solution and polymer are hermetically sealed within the casing 4.

The cell 2 is assembled in a state in which the cell is not charged (i.e. a discharged/uncharged state).

A current is then passed through the cell 2 to charge the cell 2. The applied current is relatively low and corresponds to charging rate of 0.1C or less. The low applied current ensures that a robust solid-electrolyte interphase (SEI) is formed. Furthermore, the low applied current means that the internal temperature of the cell 2, and hence the temperature of the polymer, does not reach the activation temperature of the polymer.

It will be appreciated that the cell 2 could be assembled in a charged state, in which case the charging step described above would be unnecessary.

Once charged, the cell 2 is discharged rapidly. For example, the cell 2 is discharged so that the current passing through the cell corresponds to a discharge rate which is 1C or greater. The time period over which the cell 2 is discharged should be sufficient to raise the internal temperature of the cell 2, and hence the temperature of the polymer, to a temperature that is at least equal to the activation temperature of the polymer. It will be appreciated that the increase in temperature will be dependent upon the internal resistance of the cell 2, the current passed through the cell 2 and the duration of the current flow. For example, a cell having a relatively high internal resistance will generate more heat than a cell having a relatively low internal resistance for a particular current.

Therefore, for a cell 2 having a specific internal resistance and comprising a polymer gelling agent having a known activation temperature, the required current and its duration can be determined. For example, for a cell having an internal resistance of 30 mΩ, and comprising a polymer gelling agent having an activation temperature of 40° C., it is expected that a discharge current greater than 15A applied for at least 300 seconds would be sufficient to raise the internal temperature of the cell 2, and hence the polymer gelling agent, to the activation temperature in order to effect the gelling process.

Once at or above the activation temperature the polymer softens or begins to melt such that the polymer absorbs the electrolyte solution to form a gel structure. It will be appreciated that the temperature of the polymer may be maintained at or above its activation temperature by discharge of the cell until formation of the gel structure is complete. It is expected that the gel structure will form at the elevated temperature, but that the gel will set as the mixture of the electrolyte and the polymer is cooled or allowed to cool.

The polymer may be held at a temperature at which the polymer will absorb a sufficient amount of the electrolyte to form a gel within a set period of time, such as the time in which it takes to fully discharge the cell when discharged at 1C.

The increase in the internal temperature of the cell 2 causes at least some of the electrolyte solution to vaporise and/or breakdown through parasitic reactions in order to produce a gas within the cell casing 4. The vaporised electrolyte/gas generates an increase in the pressure within the cell casing 4. Increasing the pressure within the cell casing 4 improves the formation of the gel electrolyte by enhancing absorption of the electrolyte by the polymer. The cell 2 may therefore be discharged at a predetermined rate for a predetermined period of time which is sufficient to cause the pressure in the cell casing 4 to rise to at least predetermined pressure; for example, to a predetermined pressure which is greater than ambient the pressure (e.g. atmospheric pressure), and which may be greater than 0.1 MPa above ambient pressure, for example at least 0.2 MPa above ambient pressure, such as at least 0.5 MPa above ambient pressure. The internal pressure should not exceed the burst pressure of the cell 2, which is typically 1.3 MPa above ambient pressure.

The cell 2 may then be cooled, for example by quenching, or allowed to cool, which causes the gel electrolyte to set.

Subsequent charging and discharging, of the cell 2 under normal operation does not reverse the gelling process and so the electrolyte remains as a gel.

The formation of the gel electrolyte by charging and discharging the cell 2 obviates the need for a separate heating step during manufacture. In addition, a rigid cell casing able to withstand the pressure generated within the cell casing 4 during heating is particularly advantageous because absorption of the electrolyte solution by the polymer can be enhanced by the increase of pressure within the casing 4. This is particularly advantageous in the manufacture of a cell having a rigid casing that cannot be pressurized by applying an external pressure.

It is also expected that the pressure between the adjacent layers of the jelly roll (i.e. between the first electrode 6 and the separator 10 and between the separator 10 and the second electrode 8) will improve absorbtion of the electrolyte solution by the polymer.

Figure 2:
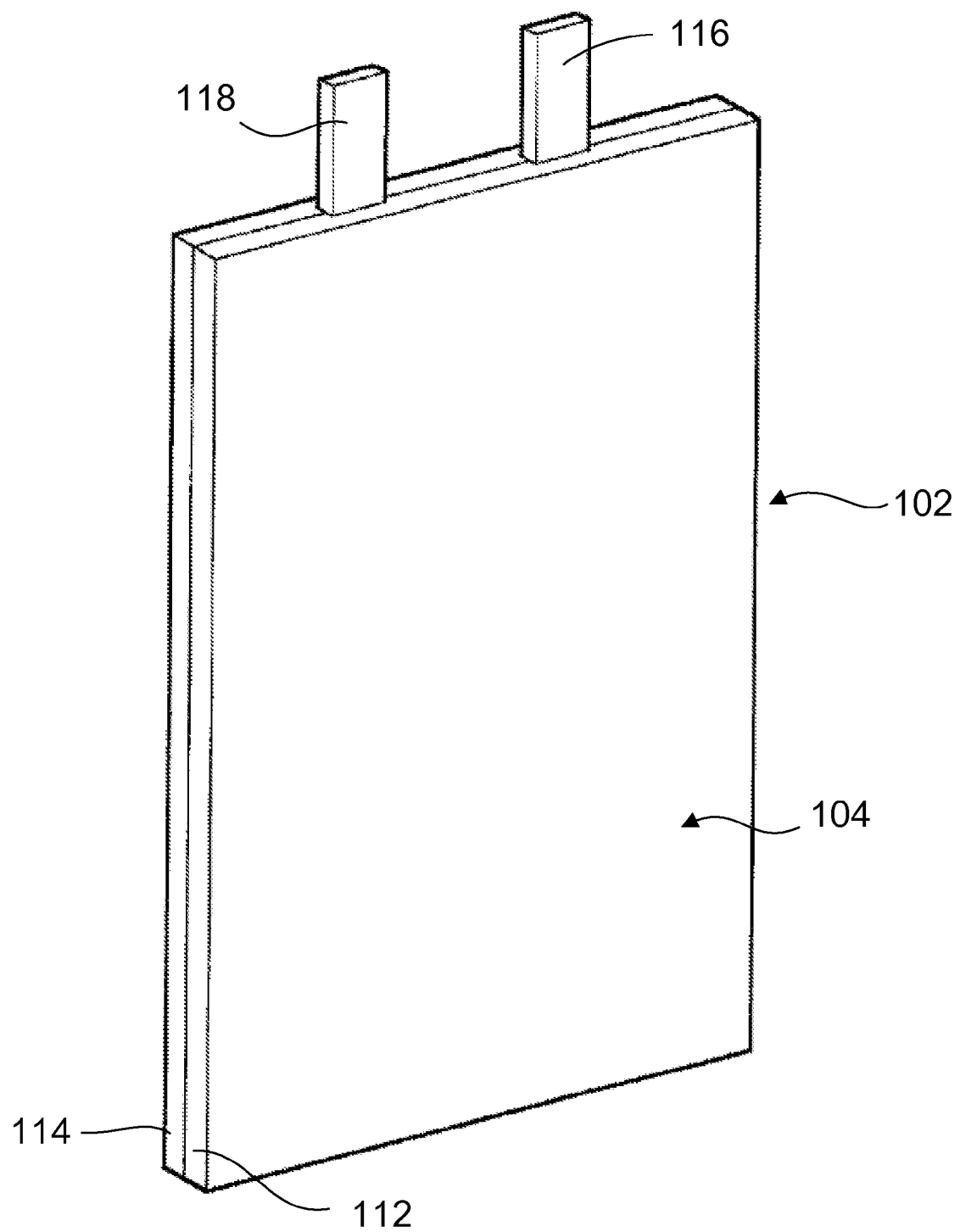
FIG. 2 is a schematic representation of a second embodiment of an electrochemical cell.

FIG. 2 shows a pouch cell 102 comprising a casing 104. The casing 104 comprises a front portion 112 and a rear portion 114 which, in the embodiment shown, are respective panels secured together at their peripheries. The front and rear portions 112, 114 are flexible. First and second electrodes and a separator (not visible) are sealed within the casing 104. The first and second electrodes are connected to first and second terminals 116, 118 which protrude from the casing 104.

The casing 104 is filled with an electrolyte solution and a gelling agent, as described in connection with the first embodiment. The pouch cell 102, 104 may be assembled in a charged state or in a state in which the cell is not charged (i.e. discharged).

If the cell 2 is assembled in a discharged state, the cell 2 is charged for the first time. For example, the cell 2 is charged until it is charged to a level that enables the following gelling process to be carried out.

Once charged, the pouch cell 102 is then discharged at a rapid rate, as described with respect to the first embodiment. The rapid rate of discharge increases the internal temperature of the pouch cell 102 and hence the temperature of the gelling agent to at least its activation temperature. Furthermore, vaporisation/breakdown of the electrolyte increases the pressure within the pouch cell 102. The increase in pressure may cause the pouch cell 102 to inflate. However, once inflated a relatively high pressure can be maintained. In the embodiment shown, the casing 104 is strong enough to resist the pressure increase during discharge. However, the cell casing 104 could be placed in an external structure which resists and maintains the pressure within the cell casing 104.

Consequently, the polymer and the electrolyte combine to form a gel electrolyte within the casing 104. An advantage of the method described above over known methods of forming a cell having a gel electrolyte is that separate steps of heating and applying a pressure to form a gel electrolyte prior to operation of the cell are not required.

In the embodiments described above, the cell 2, 102 is discharged at a predetermined current for a predetermined period of time. However, it will be appreciate that the cell 2, 102 could be discharged by a predetermined amount at a predetermined current that causes the temperature of the gelling agent to increase to at least its activation temperature. Other parameters relating to discharge of the cell could be used to ensure that the internal temperature of the cell is raised by a sufficient amount to activate the gelling agent.

In the embodiments described above, it will be appreciated that the gelling agent may be deposited, for example as a coating, on the first electrode 6, second electrode 8, separator 10 and/or the inner walls of the casing 4 in addition to or instead of mixing the gelling agent with the electrolyte solution. It is expected that depositing the gelling agent on one or more of these components will improve formation of the gel electrolyte between the electrodes 4, 6 and the separator 10. Furthermore, it is expected that the wound electrode and separator layers 4, 6, 10 of the first embodiment will exert a direct pressure on the gelling agent during the gelling process thereby improving formation of the gel electrolyte. In view of this, a roll comprising the electrodes, or the electrodes and the separator, may be wound relatively tightly so as to apply a pressure, for example a pressure greater than ambient pressure to the gelling agent between the adjacent layers. The roll could be wound at a winding tension which is sufficient to apply the pressure required to effect the gelling process.

It will also be appreciated that, for embodiments comprising the porous separator, the porous separator can be imbued with the gelling agent, for example prior to assembly of the cell and before formation of the gel electrolyte. In doing so, good dispersion of the gel electrolyte within the separator and between the electrodes can be achieved.

In the embodiments described above, the cell 2, 102 is a lithium-ion cell that is assembled in an discharged state. However, it will be appreciated that cells, such as lithium-metal, sodium-metal or magnesium cells, could be assembled in a charged or partially charged state.

Although the embodiments described above effect the gelling process during discharge of the cell 2, 102, it will be appreciated that the gelling process could also be effected during charging of the cell 2, 102 provided that applied current is sufficiently high to raise the temperature of the gelling agent to at least its activation temperature.

In a further embodiment, the cell 2, 102 is insulated while affecting the gelling process. For example, the cell 2, 102 may be disposed in a battery casing prior to passing the current through the cell 2, 102. Insulating the cell 2, 102 is expected to make the gelling process more efficient.

The invention claimed is:

1. A method of manufacturing an electrochemical cell having a gel electrolyte comprising:
   providing an electrochemical cell comprising a cell casing, and a first electrode, a second electrode, an electrolyte solution and a temperature activated gelling agent disposed within the cell casing; and
   forming a gel electrolyte comprising the electrolyte solution and the gelling agent by passing a current through the electrochemical cell such that the temperature of the gelling agent exceeds the activation temperature of the gelling agent.

2. The method of claim 1, wherein the gelling agent has an activation temperature which is not less than 40° C.

3. The method of claim 1, wherein the gelling agent comprises a polymer.

4. The method of claim 1, wherein the first electrode, second electrode, electrolyte solution and gelling agent are hermetically sealed within the casing prior to forming the gel electrolyte.

5. The method of claim 1, wherein a magnitude of the current is sufficient to vaporise at least some of the electrolyte solution thereby generating an increase in pressure within the cell.

6. The method of claim 5, wherein the cell casing is configured to resist the pressure generated within the cell casing.

7. The method of claim 6, wherein the cell casing is rigid.

8. The method of claim 5, wherein the pressure generated is greater than atmospheric pressure.

9. The method of claim 1, wherein the current is at least 10 A.

10. The method of claim 1, wherein an internal resistivity of the cell is at least 15 mΩ.

11. The method of claim 1, wherein the current is passed through the cell by discharging the cell.

12. The method of claim 11, wherein the cell is discharged at a rate of not less than 1 C.

13. The method of claim 1, wherein the current is passed through the cell by charging the cell.

14. The method of claim 1, wherein the cell casing is cylindrical and the first electrode and the second electrode are wound about the longitudinal axis of the casing.

15. The method of claim 1, wherein a separator is disposed between the first electrode and the second electrode.

16. The method of claim 15, wherein the separator is porous and the separator is imbued with the gelling agent prior to formation of the gel electrolyte.

17. The method of claim 15, wherein the gelling agent has an activation temperature that does not exceed the melting temperature of the separator.

18. The method of claim 1, wherein the gelling agent is deposited on at least one of the first electrode and the second electrode prior to forming the gel electrolyte.

19. The method of claim 18, wherein the method comprises depositing the gelling agent on the at least one of the first electrode and the second electrode by dissolving the gelling agent in a solvent, immersing the at least one of the first electrode and the second electrode in the solvent and then removing the solvent.

20. The method of claim 1, wherein the gelling agent is mixed with the electrolyte solution prior to forming the gel electrolyte.

21. The method of claim 1, wherein the electrolyte solution comprises a non-aqueous solvent.

22. The method of claim 1, wherein the cell is insulated during formation of the gel.

23. The method of claim 15, wherein the gelling agent is deposited on at least one of the first electrode, the second electrode, and the separator prior to forming the gel electrolyte.

24. The method of claim 23, wherein the method comprises depositing the gelling agent on the at least one of the first electrode, the second electrode, and the separator by dissolving the gelling agent in a solvent, immersing the at least one of the first electrode, the second electrode and the separator in the solvent and then removing the solvent.

* * * * *